United States Patent
Cheng et al.

(10) Patent No.: US 10,564,503 B2
(45) Date of Patent: Feb. 18, 2020

(54) ARRAY SUBSTRATE COMPRISING SUPPORTING PATTERN LAYERS AND DISPLAY DEVICE INCLUDING SAME

(71) Applicant: BOE TECHNOLOGY GROUP CO., LTD., Beijing (CN)

(72) Inventors: Hongfei Cheng, Beijing (CN); Pan Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 39 days.

(21) Appl. No.: 15/537,090

(22) PCT Filed: Jun. 24, 2016

(86) PCT No.: PCT/CN2016/086991
§ 371 (c)(1),
(2) Date: Jun. 16, 2017

(87) PCT Pub. No.: WO2017/148052
PCT Pub. Date: Sep. 8, 2017

(65) Prior Publication Data
US 2018/0074355 A1  Mar. 15, 2018

(30) Foreign Application Priority Data
Mar. 1, 2016  (CN) .................... 2016 2 0156233 U (51) Int. Cl.
*G02F 1/1368*  (2006.01)
*G02F 1/1339*  (2006.01)
*G02F 1/1362*  (2006.01)

(52) U.S. Cl.
CPC ........ *G02F 1/1368* (2013.01); *G02F 1/13394* (2013.01); *G02F 1/136286* (2013.01);
(Continued)

(58) Field of Classification Search
CPC combination set(s) only.
See application file for complete search history.

(56) References Cited

U.S. PATENT DOCUMENTS

2010/0118254 A1* 5/2010 Hashimoto ......... G02F 1/13394
349/155
2012/0008080 A1  1/2012 Daishi
(Continued)

FOREIGN PATENT DOCUMENTS

CN        1844992 A    10/2006
CN      102455556 A     5/2012
(Continued)

OTHER PUBLICATIONS

International Search Report dated Nov. 30, 2016.

*Primary Examiner* — Lauren Nguyen
(74) *Attorney, Agent, or Firm* — Dilworth & Barrese, LLP.; Michael J. Musella, Esq.

(57) ABSTRACT

Provided are an array substrate and a display device. The array substrate includes the array substrate. The array substrate includes at least one of a first support pattern layer and a second support pattern layer, the first support pattern layer and a gate line overlap with each other; the second support pattern layer and the data line overlap with each other, an orthogonal projection of at least one of the first support pattern layer and the second support pattern layer on the first base substrate is located outside an overlapping area of the orthogonal projections of the gate line and the data line on the first base substrate.

20 Claims, 3 Drawing Sheets

(52) U.S. Cl.
CPC ........... *G02F 1/136227* (2013.01); *G02F 2001/13396* (2013.01); *G02F 2001/136295* (2013.01)

(56) References Cited

U.S. PATENT DOCUMENTS

| | | | |
|---|---|---|---|
| 2012/0092596 A1* | 4/2012 | Cho | G02F 1/13394 349/106 |
| 2012/0138941 A1* | 6/2012 | Xu | G02F 1/133512 257/59 |

FOREIGN PATENT DOCUMENTS

| | | |
|---|---|---|
| CN | 102566145 A | 7/2012 |
| CN | 102566148 A | 7/2012 |
| JP | H11153798 A | 6/1999 |

\* cited by examiner

ARRAY SUBSTRATE COMPRISING SUPPORTING PATTERN LAYERS AND DISPLAY DEVICE INCLUDING SAME

TECHNICAL FIELD

Embodiments of the present disclosure relate to an array substrate and a display device comprising the array substrate.

BACKGROUND

A liquid crystal display technology is widely applied to televisions, mobile phones, computers and public information display. In design of a liquid crystal cell, a spacer is located above a gate line or a thin film transistor, when the liquid crystal cell is subjected to an external force, the spacer therein easily slides and deforms, as a result, a non uniform thickness of the liquid crystal cell is caused, and further a decreased display quality is caused.

SUMMARY

Embodiments of the present disclosure provide an array substrate and a display device comprising the array substrate, capable of solving the issues of non uniform thickness of the liquid crystal cell and decreased display quality caused by a case that the spacer therein easily slides and deforms.

At least one embodiments of the present disclosure provides an array substrate, including: a first base substrate, a gate line and a data line disposed on the first base substrate, and a thin film transistor located at an intersection of the gate line and the data line, wherein the thin film transistor includes a gate electrode, a gate insulating layer, an active layer, a source electrode and a drain electrode, the gate electrode of the thin film transistor is electrically connected to the gate line, the source electrode of the thin film transistor is electrically connected to the data line, the array substrate further comprises at least one of a first support pattern layer and a second support pattern layer, the first support pattern layer and the gate line overlap with each other, and the first support pattern layer and the data line are located on a same layer and are made of a same material; the second support pattern layer and the data line overlap with each other, the second support pattern layer and the gate line are located on a same layer and are made of a same material, and an orthogonal projection of the at least one of the first support pattern layer and the second support pattern layer on the first base substrate is located outside an overlapping area of orthogonal projections of the gate line and the data line on the first base substrate.

In an example, the orthogonal projection of the first support pattern layer on the first base substrate is located within the orthogonal projection of the gate line on the first base substrate.

In an example, in a width direction of the gate line, a width of the first support pattern layer is greater than that of the gate line, and two ends of the orthogonal projection of the first support pattern layer on the first base substrate are both located outside the orthogonal projection of the gate line on the first base substrate.

In an example, the orthogonal projection of the second support pattern layer on the first base substrate is located within the orthogonal projection of the data line on the first base substrate.

In an example, in a width direction of the data line, a width of the second support pattern layer is greater than that of the data line, and two ends of the orthogonal projection of the second support pattern layer on the first base substrate are both located outside the orthogonal projection of the data line on the first base substrate.

In an example, the array substrate further includes: a first spacer disposed on the first base substrate, wherein an orthogonal projection of the first spacer on the first base substrate is located within the overlapping area of an orthogonal projections of the first support pattern layer and the gate line on the first base substrate.

In an example, the array substrate further includes: a second spacer disposed on the first base substrate, wherein an orthogonal projection of the second spacer on the first base substrate is located within an overlapping area of the orthogonal projections of the second support pattern layer and the data line on the first base substrate.

In an example, the array substrate further includes: a first semiconductor material layer disposed on the first base substrate, overlapping with the first support pattern layer, wherein the first semiconductor material layer and the active layer of the thin film transistor are located on a same layer and are made of a same material.

In an example, the orthogonal projection of the first support pattern layer on the first base substrate is located within an orthogonal projection of the first semiconductor material layer on the first base substrate.

In an example, the array substrate further includes: a second semiconductor material layer disposed on the first base substrate, overlapping with the second support pattern layer, wherein the second semiconductor material layer and the active layer of the thin film transistor are located on a same layer and are made of a same material.

In an example, the orthogonal projection of the second support pattern layer on the first base substrate is located within an orthogonal projection of the second semiconductor material layer on the first base substrate.

In an example, the array substrate further includes: a first spacer disposed on the first base substrate, wherein an orthogonal projection of the first spacer on the first base substrate is located within an overlapping area of the orthogonal projections of the first semiconductor material layer, the first support pattern layer and the gate line on the first base substrate.

In an example, the array substrate further includes: a second spacer disposed on the first base substrate, wherein an orthogonal projection of the second spacer on the first base substrate is located within an overlapping area of the orthogonal projections of the second semiconductor material layer, the second support pattern layer and the data line on the first base substrate.

In an example, the first support pattern layer is physically separated and electrically insulated from the data line and the gate line.

In an example, the second support pattern layer is physically separated and electrically insulated from the data line and the gate line.

Another embodiment of the present disclosure provides a display device, including any array substrate described above, an opposed substrate, a liquid crystal layer disposed between the array substrate and the opposed substrate and at least one of a first spacer and a second spacer, wherein an orthogonal projection of the first spacer on the first base substrate is located within an overlapping area of the orthogonal projections of the first support pattern layer and the gate line on the first base substrate, and an orthogonal projection of the second spacer on the first base substrate is located within an overlapping area of the orthogonal projections of the second support pattern layer and the data line on the first base substrate.

In an example, the display device further includes: a first semiconductor material layer disposed on the first base substrate, overlapping with the first support pattern layer, wherein the first semiconductor material layer and an active layer of the thin film transistor are located on a same layer and are made of a same material.

In an example, the orthogonal projection of the first spacer on the first base substrate is located within an overlapping area of the orthogonal projections of the first semiconductor material layer, the first support pattern layer and the gate line on the first base substrate.

In an example, the display device further includes: a second semiconductor material layer disposed on the first base substrate, overlapping with the second support pattern layer, wherein the second semiconductor material layer and an active layer of the thin film transistor are located on a same layer and are made of a same material.

In an example, the orthogonal projection of the second spacer on the first base substrate is located within an overlapping area of the orthogonal projections of the second semiconductor material layer, the second support pattern layer and the data line on the first base substrate.

In an example, the opposed substrate is a color filter substrate, the color filter substrate includes a second base substrate, and a color filter layer and a black matrix layer which are disposed on the second base substrate, and the orthogonal projection of the first spacer on the second base substrate is located within an orthogonal projection of the black matrix layer on the second base substrate.

In an example, the opposed substrate is a color filter substrate, the color filter substrate includes a second base substrate, and a color filter layer and a black matrix layer which are disposed on the second base substrate, and the orthogonal projection of the second spacer on the second base substrate is located within an orthogonal projection of the black matrix layer on the second base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure. Respective film layers in the drawings are not drawn according to an actual proportion. Besides, the drawings merely show structures closely related to the embodiments of the present disclosure, and other structures can refer to a general design based on the embodiments of the present disclosure.

DETAILED DESCRIPTION

In order to clarify the objects, technical solutions and advantages of the present disclosure, the technical solutions of embodiments of the present disclosure will be described in a clearly and fully understandable way in connection with the drawings. It is obvious that the described embodiments are just a part but not all of the embodiments of the disclosure. Based on the described embodiments of the present disclosure described, those ordinary skilled in the art can obtain all other embodiment(s), without any inventive work, which should be within the scope of the disclosure. In a case of no mutual conflict, features of different embodiments in the present disclosure can be mutually combined.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is a described object is changed, the relative positional relationship may also be correspondingly changed.

Embodiments of the present disclosure provide an array substrate and a display device including the array substrate. The array substrate includes a first base substrate, a gate line and a data line disposed on the first base substrate, and a thin film transistor located at an intersection of the gate line and the data line, wherein the thin film transistor includes a gate electrode, a gate insulating layer, an active layer, a source electrode and a drain electrode, the gate electrode of the thin film transistor is electrically connected to the gate line, the source electrode of the thin film transistor is electrically connected to the data line, the array substrate further includes at least one of a first support pattern layer and a second support pattern layer, the first support pattern layer and the gate line overlap with each other, and the first support pattern layer and the data line are located on a same layer and are made of a same material; the second support pattern layer and the data line overlap with each other, and the second support pattern layer and the gate line are located on a same layer and are made of a same material, and a orthogonal projection of at least one of the first support pattern layer and the second support pattern layer on the first base substrate is located outside an overlapping area of orthogonal projections of the gate line and the data line on the first base substrate.

First Embodiment

Figure 1:
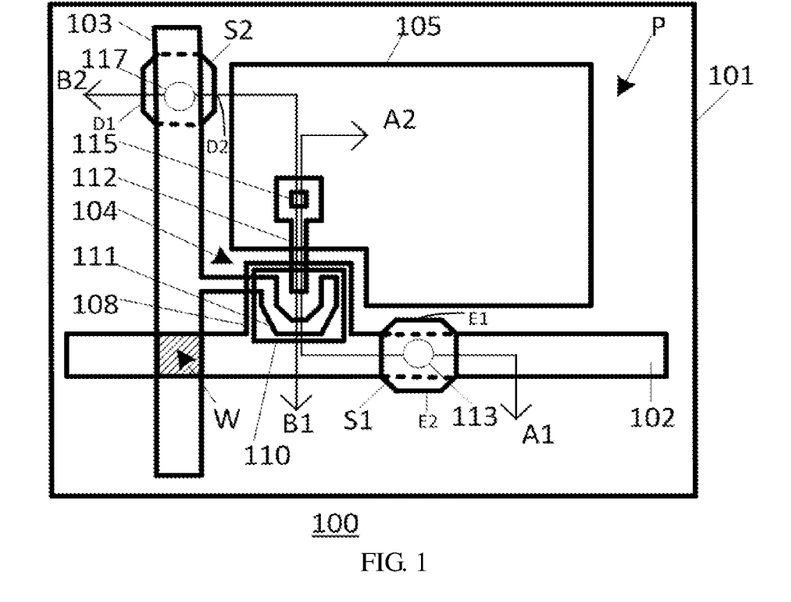
FIG. 1 is a schematic diagram of a planar structure of an array substrate provided by a first embodiment of the present disclosure.
Figure 2:
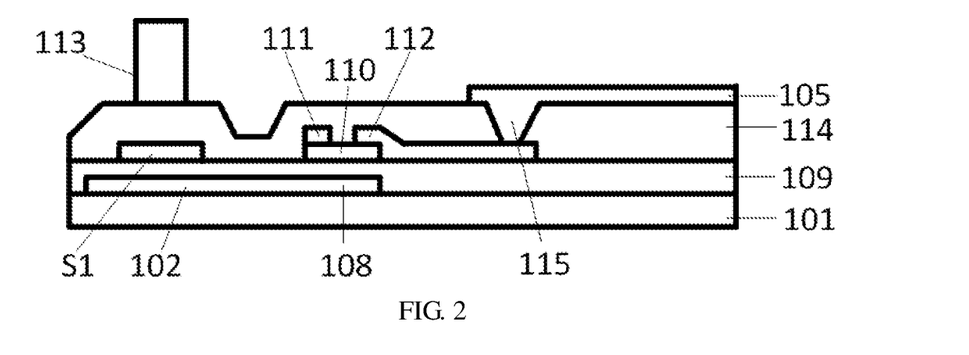
FIG. 2 is a schematic diagram of a sectional structure of the array substrate as shown in FIG. 1 along a line A1-A2.

FIG. 1 is a schematic diagram of a planar structure of an array substrate provided by a first embodiment of the present disclosure; FIG. 2 is a schematic diagram of a sectional structure of the array substrate as shown in FIG. 1 along a line A1-A2; and FIG. 3 is a schematic diagram of a sectional structure of the array substrate as shown in FIG. 1 along a line B1-B2.

Figure 3:
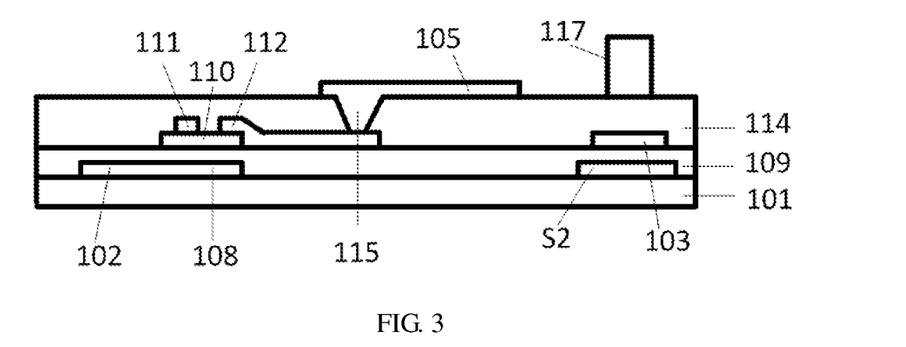
FIG. 3 is a schematic diagram of a sectional structure of the array substrate as shown in FIG. 1 along a line A1-A2.

Hereinafter, FIGS. 1, 2 and 3 are referenced to describe the array substrate provided by the first embodiment of the present disclosure. The array substrate 100 includes a first base substrate 101, and a gate line 102, a data line 103, a thin film transistor 104, a pixel electrode 105, a first support pattern layer S1 and a second support pattern layer S2, which are located on the first base substrate 101. For example, the gate line 102 extends in a transverse direction, and the data line 103 extends in a longitudinal direction perpendicular to the transverse direction. The thin film transistor 104 is disposed at an intersection of the gate line 102 and the data line 103. The pixel electrode 105 is disposed in a pixel area P defined by the gate line 102 and the data line 103 intersected with each other.

The thin film transistor 104 includes a gate electrode 108, a gate insulating layer 109, an active layer 110, a source electrode 111 and a drain electrode 112 which are sequentially stacked in a direction away from the first base substrate 101. The gate electrode 108 of the thin film transistor 104 is electrically connected to the gate line 102. For example, the gate electrode 108 of the thin film transistor 104 is integrally formed with the gate line 102. The source electrode 111 of the thin film transistor 104 is electrically connected to the data line 103. For example, the source electrode 111 of the thin film transistor 104 is integrally formed with the data line 103. The first support pattern layer S1 and the gate line 102 overlap with each other, and the first support pattern layer S1 and the data line 103 are located on a same layer and are made of a same material. The second support pattern layer S2 and the data line 103 overlap with each other, and the second support pattern layer S2 and the gate line 102 are located on a same layer and are made of a same material.

An orthogonal projection of the first support pattern layer S1 on the first base substrate 101 and an orthogonal projection of the second support pattern layer S2 on the first base substrate 101 are located outside an overlapping area W of orthogonal projections of the gate line 102 and the data line 103 on the first base substrate 101. In FIG. 1, the overlapping area W of the orthogonal projections of the gate line 102 and the data line 103 on the first base substrate 101 is shown as a rectangular shadow portion. It is noted that in all embodiments of the present disclosure, "one area is located outside another area" means that "the one area is totally separated from the other area". That is, no intersection is between the one area and the other area. Thus, "the orthogonal projections of the first support pattern layer S1 and the second support pattern layer S2 on the first base substrate are located outside an overlapping area of the orthogonal projections of the gate line 102 and the data line 103 on the first base substrate 101" means that "the orthogonal projections of the first support pattern layer S1 and the second support pattern layer S2 on the first base substrate 101 are totally separated from the overlapping area W of the orthogonal projections of the gate line 102 and the data line 103 on the first base substrate 101".

For example, in the array substrate 100 provided by the present embodiment, referring to FIGS. 1, 2 and 3, the first support pattern layer S1 is physically separated and electrically insulated from the data line 103 and the gate line 102; and the second support pattern layer S2 is physically separated and electrically insulated from the data line 103 and the gate line 102. In this case, the orthogonal projection of the first support pattern layer S1 on the first base substrate 101 is separated from the overlapping area of the orthogonal projections of the gate line 102 and the data line 103 on the first base substrate 101, and the orthogonal projection of the second support pattern layer S2 on the first base substrate 101 is separated from the overlapping area of the orthogonal projections of the gate line 102 and the data line 103 on the first base substrate 101.

In the array substrate provided by the first embodiment, since the first support pattern layer S1 overlapping with the gate line 102 and the second support pattern layer S2 overlapping with the data line 103 are disposed, a spacer above the first support pattern layer and/or the second support pattern layer can be better supported, such that a relative uniform thickness of the liquid crystal cell is obtained and further, the stability of the liquid crystal cell against the impact of an external force is increased.

For example, referring to FIG. 1, the orthogonal projections of the first support pattern layer S1 and the second support pattern layer S2 on the first base substrate 101 for example are located outside the orthogonal projections of the gate electrode 108, the source electrode 111 and the drain electrode 112 of the thin film transistor 104 on the first base substrate 101.

For example, the first support pattern layer S1 and the second support pattern layer S2 can be in a shape of rectangle, hexagon, octagon, round, square or any other polygon. The gate line 102 and the data line 103 are, for example, in a shape of straight stripe.

For example, referring to FIGS. 2 and 3, the array substrate 100 provided by the present embodiment further includes a passivation layer 114 covering the source electrode 111 and the drain electrode 112 of the thin film transistor 104 and a via hole 105 disposed above the drain electrode 112 and penetrating through the passivation layer 114. The pixel electrode 105 is electrically connected to the drain electrode 112 of the thin film transistor 104 through the via hole 115.

For example, in the array substrate 100 provided by the present embodiment, referring to FIGS. 1, 2 and 3, in a width direction of the gate line 102, the width of the first support pattern layer S1 is greater than that of the gate line 102, and two ends E1 and E2 of the orthogonal projection of the first support pattern layer S1 on the first base substrate 101 are both located outside the orthogonal projection of the gate line 102 on the first base substrate 101. For example, in the width direction of the gate line 102, two ends E1 and E2 of the orthogonal projection of the first support pattern layer S1 on the first base substrate 101 are respectively located on two opposite sides of the orthogonal projection of the gate line 102 on the first base substrate 101. Herein, the width direction of the gate line 102, is for example, a direction perpendicular to an extending direction of the gate line 102. Thus, an overlapping area between the first support pattern layer S1 and the gate line 102 is relatively large.

For example, in the array substrate 100 provided by the present embodiment, referring to FIGS. 1, 2 and 3, in a width direction of the data line 103, the width of the second support pattern layer S2 is greater than that of the data line 103, and two ends D1 and D2 of the orthogonal projection of the second support pattern layer S2 on the first base substrate 101 are both located outside the orthogonal projection of the data line 103 on the first base substrate 101. For example, in the width direction of the data line 103, two ends D1 and D2 of the orthogonal projection of the second support pattern layer S2 on the first base substrate 101 are respectively located on two opposite sides of the orthogonal projection of the data line 103 on the first base substrate 101. Herein, the width direction of the data line 103 is, for example, a direction perpendicular to an extending direction of the data line 103. Thus, an overlapping area between the second support pattern layer S2 and the data line 103 is relatively large.

In another example, the orthogonal projection of the first support pattern layer S1 on the first base substrate 101 is located within the orthogonal projection of the gate line 102 on the first base substrate 101; for example, an orthogonal projection of the second support pattern layer S2 on the first base substrate 101 is located within the orthogonal projection of the data line 103 on the first base substrate 101. It is noted that in all embodiments of the present disclosure, "one area is located within another area" means that "the one area is located inside the other area and does not exceed the edge of the other area". In such case, neither the first support pattern layer S1 nor the second support pattern layer S2 occupies an aperture area of pixels, which is favorable for improving an aperture ratio of the array substrate.

For example, in the array substrate 100 provided by the present embodiment, referring to FIGS. 1, 2 and 3, the array substrate 100 further includes: a first spacer 113 and a second spacer 117 disposed on the first base substrate 101. An orthogonal projection of the first spacer 113 on the first base substrate 101 is located within the overlapping area of the orthogonal projections of the first support pattern layer S1 and the gate line 102 on the first base substrate 101. An orthogonal projection of the second spacer 117 on the first base substrate 101 is located within the overlapping area of the orthogonal projections of the second support pattern layer S2 and the data line 103 on the first base substrate 101. In the array substrate provided by the first embodiment, the orthogonal projection of the first spacer 113 on the first base substrate 101 is smaller than the overlapping area of the orthogonal projections of the first support pattern layer S1 and the gate line 102 on the first base substrate 101, and the orthogonal projection of the first spacer 113 on the first base substrate 101 is enclosed by the overlapping area of the orthogonal projections of the first support pattern layer S1 and the gate line 102 on the first base substrate 101. The orthogonal projection of the second spacer 117 on the first base substrate 101 is smaller than the overlapping area of the orthogonal projections of the second support pattern layer S2 and the data line 103 on the first base substrate 101, and the orthogonal projection of the second spacer 117 on the first base substrate 101 is enclosed by the overlapping area of the orthogonal projections of the second support pattern layer S2 and the data line 103 on the first base substrate 101.

For example, the number of the first spacers 113 and second spacers 117 is one or more and is not limited in the present embodiment.

Although the array substrate provided by the first embodiment as shown in FIGS. 1-3 includes both the first support pattern layer S1 and the second support pattern layer S2, it can be understood that the array substrate provided by other embodiments can only include the first support pattern layer S1 or the second support pattern layer S2. Although the array substrate provided by the first embodiment as shown in FIGS. 1-3 includes both the first spacer 113 and the second spacer 117, it can be understood that the array substrate provided by other embodiments can only include the first spacer 113 or the second spacer 117. The array substrate provided by another embodiment may not include the first spacer 113 and the second spacer 117. The first spacer 113 and the second spacer 117 for example can be formed on an opposed substrate to be cell assembled with the array substrate provided by the embodiment of the present application.

Second Embodiment

Figure 4:
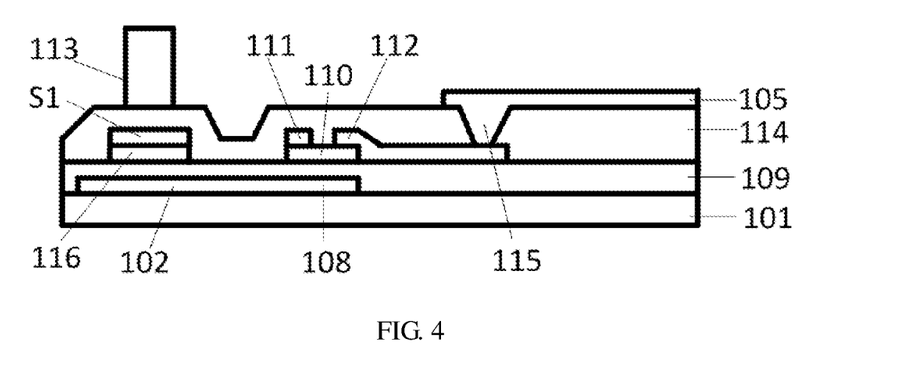
FIG. 4 is a schematic diagram of a sectional structure of an array substrate provided by a second embodiment of the present disclosure.
Figure 5:
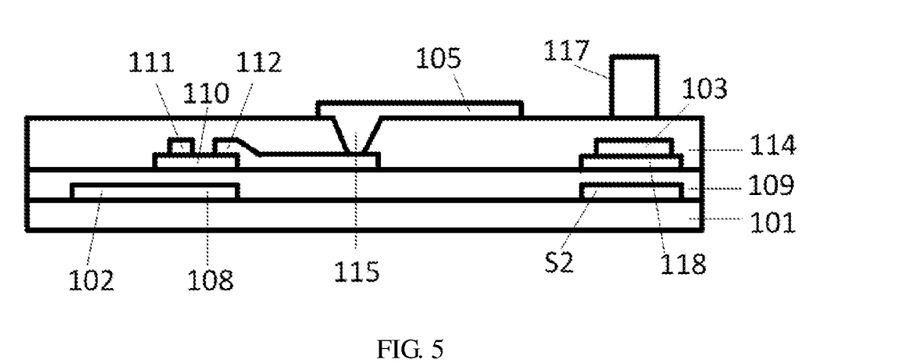
FIG. 5 is a schematic diagram of another sectional structure of an array substrate provided by the second embodiment of the present disclosure.

FIGS. 4 and 5 show a schematic diagram of a section of an array substrate provided by the second embodiment of the present disclosure. The array substrate provided by the second embodiment can have the structure basically same as that of the array substrate provided by the first embodiment except for semiconductor material layers 116 and 118. Therefore, repeated description on the same parts is omitted herein, and the same terms and same reference signs are intended to represent the same parts.

The sectional structures of the array substrate provided by the second embodiment as shown in FIGS. 4 and 5 respectively correspond to the section structures of the array substrate provided by the first embodiment as shown in FIGS. 2 and 3.

As shown in FIGS. 4 and 5, the array substrate provided by the second embodiment further includes a first semiconductor material layer 116 and a second semiconductor material layer 118 which are disposed on a same layer as the active layer 110 and made of the same material. The first semiconductor material layer 116 and the first support pattern layer S1 overlap with each other, and the second semiconductor material layer 118 and the second support pattern layer S2 overlap with each other.

For example, the orthogonal projection of the first support pattern layer S1 on the first base substrate 101 is located within the orthogonal projection of the first semiconductor material layer 116 on the first base substrate. Referring to FIG. 4, the orthogonal projection of the first support pattern layer S1 on the first base substrate 101 overlaps with the orthogonal projection of the first semiconductor material layer 116 on the first base substrate 101. For example, the orthogonal projection of the first spacer 113 on the first base substrate 101 is located within an overlapping area of the orthogonal projections of the first semiconductor material layer 116 and the gate line 102 on the first base substrate 101.

For example, the orthogonal projection of the second support pattern layer S2 on the first base substrate 101 is located within the orthogonal projection of the second semiconductor material layer 118 on the first base substrate 101. Referring to FIG. 5, the orthogonal projection of the second support pattern layer S2 on the first base substrate 101 overlaps with the orthogonal projection of the second semiconductor material layer 118 on the first base substrate 101. For example, the orthogonal projection of the second spacer 117 on the first base substrate 101 is located within an overlapping area of the orthogonal projections of the second semiconductor material layer 118, the second support pattern layer S2 and the data line 103 on the first base substrate 101.

In the array substrate provided by the present embodiment, the first semiconductor material layer 116 and the first support pattern layer S1 can provide a better support for the above first spacer 113 together; and the second semiconductor material layer 118 and the second support pattern layer S2 can provide a better support for the above second spacer 117 together.

Third Embodiment

The third embodiment of the present disclosure provides a display device, comprising the array substrate provided by any above embodiment. Therefore, repeated description on the same parts is omitted herein, and the same terms and same reference signs are intended to represent the same parts.

Figure 6:
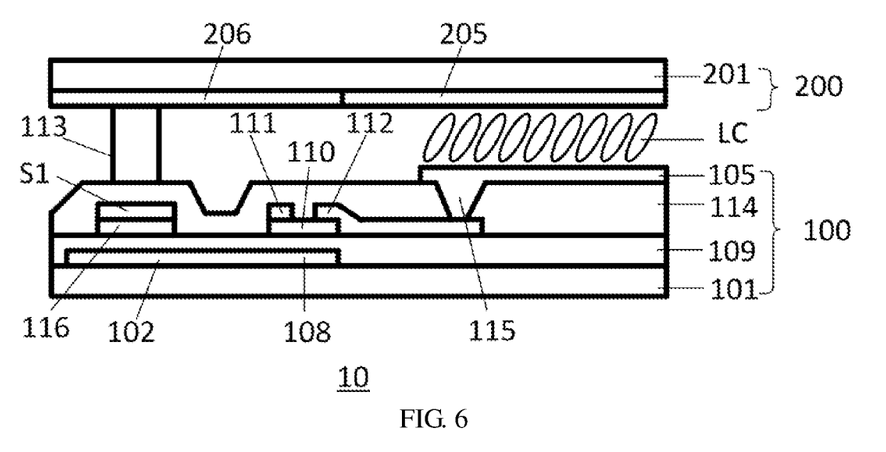
FIG. 6 is a schematic diagram of a sectional structure of a display device provided by a third embodiment of the present disclosure.

FIG. 6 shows a schematic diagram of a section of a display device provided by the third embodiment of the present disclosure. The display device 10, for example, includes an array substrate 100, an opposed substrate 200, a liquid crystal molecular layer LC disposed between the array substrate 100 and the opposed substrate 200 and a first spacer 113. An orthogonal projection of the first spacer 113 on the first base substrate 101 is located within an overlapping area of orthogonal projections of the first support pattern layer S1 and the gate line 102 on the first base substrate 101.

For example, in the display device 10 provided by the present embodiment, as shown in FIG. 6, a first semiconductor material layer 116 located on a same layer and made of a same material as the active layer 110 is disposed on the first base substrate 101. The first semiconductor material layer 116 and the first support pattern layer S1 overlap with each other.

For example, the orthogonal projection of the first spacer 113 on the first base substrate 101 is located within an overlapping area of the orthogonal projections of the first semiconductor material layer 116, the first support pattern layer S1 and the gate line 102 on the first base substrate 101.

It needs to be noted that although not shown in FIG. 6, in an example, the display device 10 can further comprise the second spacer 117 and the second support pattern layer S2 as shown in FIG. 5. The orthogonal projection of the second spacer 117 on the first base substrate 101 is located within the overlapping area of the orthogonal projections of the second support pattern layer S2 and the data line 103 on the first base substrate 101.

In addition, in an example, the display device 10 can further comprise a second semiconductor material layer 118 located on a same layer and made of a same material as the active layer 110. The second semiconductor material layer 118 and the second support pattern layer S2 overlap with each other. In such case, the orthogonal projection of the second spacer 117 on the first base substrate 101 is located within an overlapping area of the orthogonal projections of the second semiconductor material layer 118, the second support pattern layer S2 and the data line 103 on the first base substrate 101.

For example, in the display device 10 provided by the present embodiment, as shown in FIG. 6, the opposed substrate 200 is a color filter substrate. The color filter substrate includes a second base substrate 201 and a color filter layer 205 and a black matrix layer 206 which are disposed on the second base substrate 201. An orthogonal projection of the first spacer 113 on the second base substrate 201 is located within an orthogonal projection of the black matrix layer 206 on the second base substrate 201.

For example, in a case that the display device 10 includes the second spacer 117, an orthogonal projection of the second spacer 117 on the second base substrate 201 is located within the orthogonal projection of the black matrix layer 206 on the second base substrate 201.

The display device provided by the embodiment of the present disclosure is not limited to a liquid crystal display device that the color filter layer 205 and the thin film transistor 104 are respectively located disposed on different base substrates as shown in FIG. 6. In another example, the display device 10 can be a liquid crystal display device that the color filter layer is formed on the array substrate (Color on Array (COA)). In such case, the color filter layer 205 is not included on the opposed substrate 20.

The display device provided by the embodiment of the present discourse can comprise the first spacer 113 and the second spacer 117, and also can only comprise the first spacer 113 or the second spacer 117.

Fourth Embodiment

The fourth embodiment of the present disclosure provides a manufacturing method for the array substrate as shown in FIGS. 1, 2 and 3. The manufacturing method for example sequentially includes:

Step S101: forming a gate line 102, a gate electrode 108 of a thin film transistor and a second support pattern layer S2 on a first base substrate 101;

For example, a first metal film layer is sputtered and deposited on the first base substrate 101. A material of the first metal film layer for example includes Cu, Al, Mo, Ti, Cr, W or alloys of these metal materials. Then the first metal film layer is subjected to a single patterning process (for example, the patterning process can include steps of photoresist coating, exposure, developing, etching, photoresist stripping, etc.) to form the gate line 102 and the gate electrode 108 and the second support pattern layer S2 located on a same layer and made of a same material. The gate line 102, the gate electrode 108 and the second support pattern layer S2 can be a monolayer or multilayer structure, such as Mo/Al/Mo, Ti/Cu/Ti, MoTi/Cu, Ti/Cu/Mo, etc.

Step S102: forming a gate insulating layer 109 on the first base substrate 101 where the gate line 102, the gate electrode 108 of a thin film transistor and the second support pattern layer S2 are formed;

For example, on the first base substrate 101 where the gate line 102, the gate electrode 108 and the second support pattern layer S2 are formed, a first insulating film layer of silicon nitride, silicon oxide or the like is deposited through a Plasma Enhanced Chemical Vapor Deposition (PECVD) process. The first insulating film layer can serve as the gate insulating layer 109, which can be a monolayer or multilayer structure, for example, silicon oxide/silicon nitride.

Step S103: forming an active layer 110 on the first base substrate 101 where the gate insulating layer 109 is formed;

On the first base substrate 101 where the gate insulating layer 109 is formed, for example, a-Si and n+a-Si are continuously deposited through the PECVD process to form a semiconductor film layer, or Indium Gallium Zinc Oxide (IGZO) is sputtered and deposited to form a semiconductor film layer. Then the semiconductor film layer is subjected to a single patterning process to form the active layer 110. A material of the active layer 110 adopts amorphous silicon, polycrystalline silicon, microcrystalline silicon or oxide semiconductor.

Step S104: forming a data line 103, a source electrode 111 and a drain electrode 112 of the thin film transistor and a support pattern layer S1 on the first base substrate 101 where the active layer 110 is formed;

A second metal film layer is sputtered and deposited on the first base substrate 101 where the active layer 110 is formed. A material of the second metal film layer for example is Cu, Al, Mo, Ti, Cr, W or alloys of these metal materials. Then the second metal film layer is subjected to a single patterning process to form the data line 103, the source electrode 111 and the drain electrode 112 which are on a same layer and made of a same material and the first support pattern layer S1. The data line 103, the source electrode 111, the drain electrode 112 and the first support pattern layer S1 can be a monolayer or multilayer structure, such as Mo/Al/Mo, Ti/Cu/Ti, MoTi/Cu, Ti/Cu/Mo, etc.

Step S105: forming a passivation layer 114 and a via hole 115 in the first base substrate 101 where the data line 103, the source electrode 111, the drain electrode 112 and the first support pattern layer S1 are formed;

A second insulating film layer is formed on the first base substrate 101 where the data line 103, the source electrode 111, the drain electrode 112 and the first support pattern layer S1 are formed. The second insulating film layer can be formed by depositing silicon nitride or silicon oxide through the PECVD process. Then the second insulating film layer is subjected to a single patterning process to form the via hole 115, and the second insulating film layer can serve as the passivation layer 114. The passivation layer 114 can be a monolayer or multilayer structure; and a material of the passivation layer 114 for example is silicon oxide/silicon nitride, or an organic insulating material such as an organic resin material.

Step S106: forming a pixel electrode 105 on the first base substrate 101 where the via hole 115 and the passivation layer 114 are formed;

For example, a transparent metal oxide conductive material layer for example an indium tin oxide (ITO) layer can be formed through a sputtering process, and then the pixel electrode 105 can be formed by a single patterning process.

It is known from the description above that in the method for forming the array substrate provided by the present embodiment, without increase of other process steps, the array substrate comprising the first support pattern layer S1 and/or the second support pattern layer S2 provided by the embodiment of the present disclosure can be formed. By forming the first support pattern layer S1 on a same layer and made of a same material as the data line 103 and/or forming the second support pattern layer S2 on a same layer and made of a same material as the gate line 102, the array substrate having a well supporting property for spacer can be formed without increasing a process cost basically.

Although the disclosure has been described above in great detail with general descriptions and specific embodiments, on the basis of the embodiments of the disclosure, various changes and improvements may be made, which is apparent to those skilled in the art. Therefore, all such changes and improvements without departing from the spirit of the disclosure are within the scope of the claims of the disclosure.

The application claims priority of Chinese Patent Application No. 201620156233.5 filed on Mar. 1, 2016, the disclosure of which is incorporated herein by reference in its entirety as part of the present application.

The invention claimed is:

1. An array substrate, comprising:
a first base substrate;
a gate line and a data line, each disposed on the first base substrate, and
a thin film transistor located at an intersection of the gate line and the data line, the thin film transistor comprising:
a gate electrode electrically connected to the gate line;
a gate insulating layer;
an active layer;
a source electrode electrically connected to the data line; and
a drain electrode;
at least one of a first support pattern layer and a second support pattern layer, the first support pattern layer and the gate line overlapping with each other, the first support pattern layer and the data line being located on a same layer and being made of a same material, the second support pattern layer and the data line overlapping with each other, the second support pattern layer and the gate line being located on a same layer and being made of a same material; and
a first spacer, disposed on a side of the first support pattern layer away from the gate line, an orthogonal projection of the first spacer on the first base substrate does not exceed each edge of an overlapping area between an orthogonal projection of the first support pattern layer on the first base substrate and an orthogonal projection of the gate line on the first base substrate,
wherein an orthogonal projection of the second support pattern layer on the first base substrate is located within an orthogonal projection of the data line on the first base substrate in both longitude and transverse directions.

2. The array substrate according to claim 1, wherein the orthogonal projection of the first support pattern layer on the first base substrate is located within the orthogonal projection of the gate line on the first base substrate.

3. The array substrate according to claim 1, wherein in a width direction of the gate line, a width of the first support pattern layer is greater than that of the gate line, and two ends of the orthogonal projection of the first support pattern layer on the first base substrate are both located outside the orthogonal projection of the gate line on the first base substrate.

4. The array substrate according to claim 1, wherein in a width direction of the data line, a width of the second support pattern layer is greater than that of the data line, and two ends of the orthogonal projection of the second support pattern layer on the first base substrate are both located outside the orthogonal projection of the data line on the first base substrate.

5. The array substrate according to claim 1, wherein the orthogonal projection of the first spacer on the first base substrate is located within the overlapping area of the orthogonal projections of the first support pattern layer and the gate line on the first base substrate.

6. The array substrate according to claim 1, further comprising: a second spacer disposed on the first base substrate, wherein an orthogonal projection of the second spacer on the first base substrate is located within an overlapping area of the orthogonal projections of the second support pattern layer and the data line on the first base substrate.

7. The array substrate according to claim 1, further comprising: a first semiconductor material layer disposed on the first base substrate, overlapping with the first support pattern layer, wherein the first semiconductor material layer and the active layer of the thin film transistor are located on a same layer and are made of a same material.

8. The array substrate according to claim 7, wherein the orthogonal projection of the first support pattern layer on the first base substrate is located within an orthogonal projection of the first semiconductor material layer on the first base substrate.

9. The array substrate according to claim 1, further comprising: a second semiconductor material layer disposed on the first base substrate, overlapping with the second support pattern layer, wherein the second semiconductor material layer and the active layer of the thin film transistor are located on a same layer and are made of a same material.

10. The array substrate according to claim 9, wherein the orthogonal projection of the second support pattern layer on the first base substrate is located within an orthogonal projection of the second semiconductor material layer on the first base substrate.

11. The array substrate according to claim 7, wherein the orthogonal projection of the first spacer on the first base substrate is located within the overlapping area of the orthogonal projections of the first support pattern layer and the gate line on the first base substrate.

12. The array substrate according to claim 9, further comprising: a second spacer disposed on the first base substrate, wherein an orthogonal projection of the second spacer on the first base substrate is located within an overlapping area of the orthogonal projections of the second semiconductor material layer, the second support pattern layer and the data line on the first base substrate.

13. The array substrate according to claim 1, wherein the first support pattern layer is physically separated and electrically insulated from the data line and the gate line.

14. The array substrate according to claim 1, wherein the second support pattern layer is physically separated and electrically insulated from the data line and the gate line.

15. A display device, comprising:
the array substrate according to claim 1;
an opposed substrate;
a liquid crystal layer disposed between the array substrate and the opposed substrate; and
at least one of a first spacer and a second spacer, an orthogonal projection of the first spacer on the first base substrate being located within an overlapping area of the orthogonal projections of the first support pattern layer and the gate line on the first base substrate, and an orthogonal projection of the second spacer on the first base substrate being located within an overlapping area of the orthogonal projections of the second support pattern layer and the data line on the first base substrate.

16. The display device according to claim 15, further comprising: a first semiconductor material layer disposed on the first base substrate, overlapping with the first support pattern layer, wherein the first semiconductor material layer and an active layer of the thin film transistor are located on a same layer and are made of a same material.

17. The display device according to claim 16, wherein the orthogonal projection of the first spacer on the first base substrate is located within an overlapping area of the orthogonal projections of the first semiconductor material layer, the first support pattern layer and the gate line on the first base substrate.

18. The display device according to claim 15, further comprising: a second semiconductor material layer disposed on the first base substrate, overlapping with the second support pattern layer, wherein the second semiconductor material layer and an active layer of the thin film transistor are located on a same layer and are made of a same material.

19. The display device according to claim 18, wherein the orthogonal projection of the second spacer on the first base substrate is located within an overlapping area of the orthogonal projections of the second semiconductor material layer, the second support pattern layer and the data line on the first base substrate.

20. The array substrate according to claim 1, wherein the orthogonal projection of the second support pattern layer on the first base substrate is located inside the orthogonal projection of the data line on the first base substrate.

* * * * *